358-69. OR 2,924,649 SR

SEARCH ROOM

Feb. 9, 1960 D. H. PRITCHARD 2,924,649

ADAPTATION OF STANDARD COLOR SIGNAL FOR USE WITH VERTICAL STRIP COLOR TUBE

Filed Feb. 14, 1955 3 Sheets-Sheet 1

INVENTOR.
Dalton H. Pritchard
BY
ATTORNEY

INVENTOR.
Dalton H. Pritchard
BY
[signature]
ATTORNEY

Feb. 9, 1960 D. H. PRITCHARD 2,924,649

ADAPTATION OF STANDARD COLOR SIGNAL FOR USE WITH VERTICAL STRIP COLOR TUBE

Filed Feb. 14, 1955 3 Sheets-Sheet 3

INVENTOR.
Dalton H. Pritchard
BY
[signature]
ATTORNEY

United States Patent Office
2,924,649
Patented Feb. 9, 1960

2,924,649

ADAPTATION OF STANDARD COLOR SIGNAL FOR USE WITH VERTICAL STRIP COLOR TUBE

Dalton H. Pritchard, Princeton, N.J., assignor to Radio Corporation of America, a corporation of Delaware Application February 14, 1955, Serial No. 488,067

8 Claims. (Cl. 178—5.4)

The present invention relates to elemental color display devices and more particularly to the development of signals for direct application thereto.

Color image reproducers have been proposed which employ vertical red, green and blue light emitting strips on a target area, in conjunction with indexing strips which provide control of the color information applied to an electron gun. Color information in a transmitted color television signal may be directly sampled on the target area.

The standard color television signal contains color information relating to red, green and blue primary colors; this color information is contained in a composite signal including a luminance signal which describes the luminance or brightness of the transmitted color image and a chrominance signal which contains color-difference signals. The nature of the standard color television signal is such that the color information, at each of the three primary colors, is transmitted at different relative signal levels in both the luminance and chrominance signals. In addition, the color-difference signals which are transmitted in the chrominance signal are asymmetrically phased. For optimum employment of the sampling process on a target area having prescribed characteristics, it is then expedient to reform the color television signal according to the color distribution, light emitting efficiency, and color phasing characteristics associated with that target area.

It is, therefore, an object of this invention to provide for improved operation of a strip type of color image reproducer.

It is still a further object of this invention to provide for a conversion of the standard color television signal to one wherein the red, green and blue color information is included at prescribed signal levels for color balance and at a sampling frequency characteristic of an image reproducer target area.

The objects of this invention are accomplished, in conjunction with a sequential display type of color image reproducer having a target area characterized by optimum sampling and light emission efficiency characteristic. The luminance signal and the chrominance signal of the standard color television signal are converted to a new color television signal having a luminance signal and a chrominance signal whose characteristics correspond to the characteristics of the target area of the color image reproducer. The new color subcarrier frequency and phase corresponds to the repetition rate and phase of the scanning of the sequence of different selected component color strips of the target area, and the color balance of the new signal corresponds to the color balance of the color strips.

Other and incidental objects of this invention will become apparent upon a reading of the following specifications and a study of the drawings wherein.

Figures 1, 2:
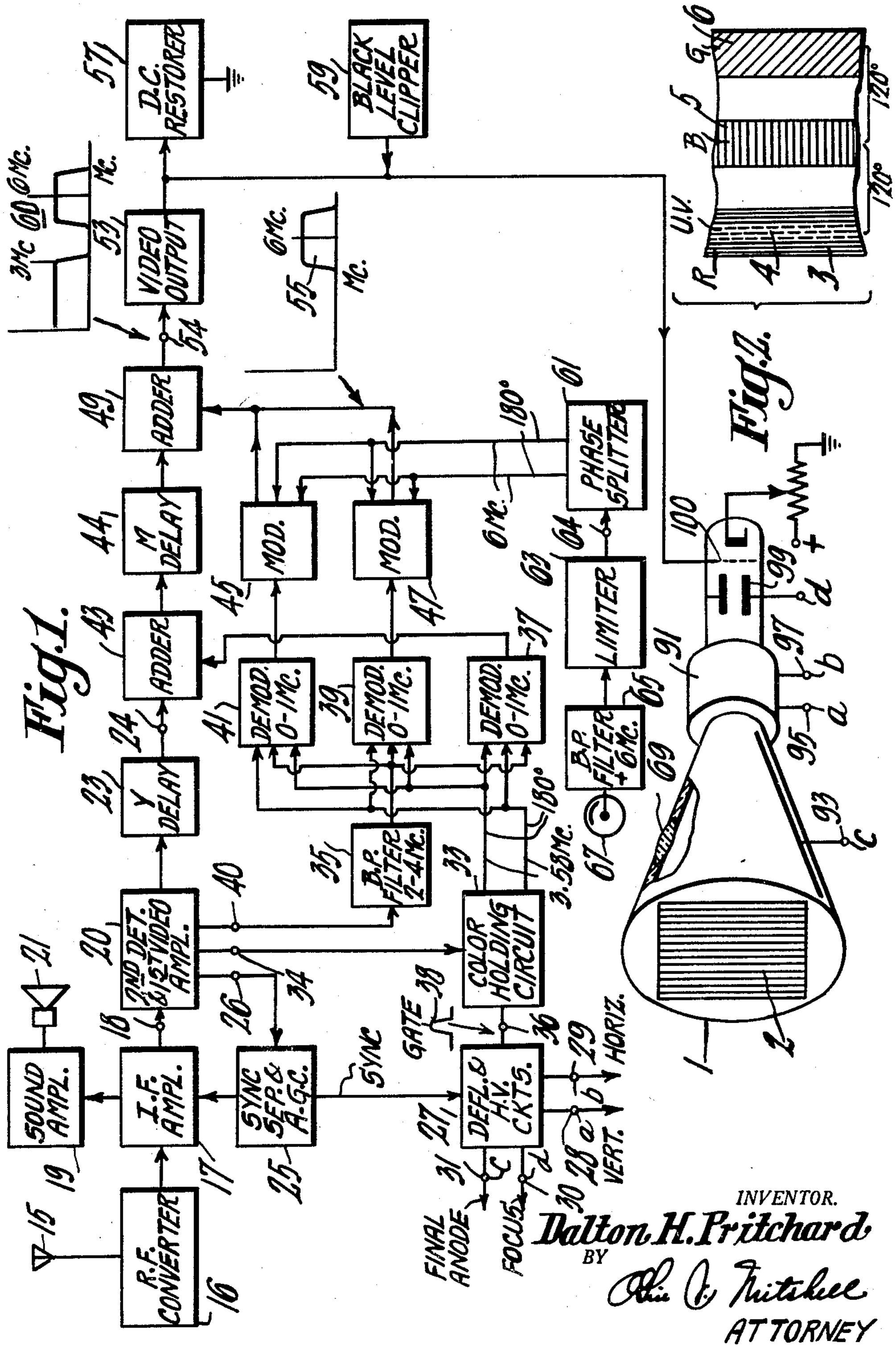
Figure 1 shows the block diagram of the color television receiver employing the teachings of the present invention.
Figure 2 illustrates the alignment and phase differences between the phosphor and ultraviolet indexing strips on the face of the color kinescope shown in Figure 1.

If the composite color television signal is utilized to modulate the scanning beam of a color image reproducer whose target area is made up of a sequence of component color phosphor strips, certain demands are made on the nature of the composite color television signal before the target area may optimally time sequential sample the color information contained in the scanning beam. These demands may be listed as follows:

(A) The target area will be characterized by a frequency of component color selection which will be a function of both the scanning velocity and the number and the disposition of the color phosphor strips. The frequency of the component color selection, which may vary during the scanning line due to irregularities in the target area or to non-linear scanning, will prescribe the mean frequency of the chrominance signal of the composite color television signal.

(B) The orientation of the component color phosphor strips in a group which constitutes a complete color sequence, will then prescribe the optimum phase relationships which must exist between the corresponding component color-difference signals in the chromiance signal.

(C) The efficiency of the cathode-luminescent light-emission proceseses associated with each of the component color phosphor strips will determine the relative amplitude levels of both the component color signals in the luminance signals and the corresponding color-difference signals in order to provide proper color balance of the reconstructed color image.

(D) Since the component color phosphor strips are of finite width, the amplitude level of the chrominance signal must be adjusted with respect to the amplitude level of the luminance signal to provide proper color saturation.

A concept relating to target areas, essential for an understanding of the present invention will be illustrated and described with reference to the color image reproducer 1 of Figure 1, this color image reproducer being of a type having a target area 2 including vertical color strips. An enlarged version of the target area 2 is shown in Fig. 2. This target area 2 includes a red light-emissive color phosphor strip 3 followed by a blue light-emissive color phosphor strip 5 and a green light-emissive color phosphor strip 6, all so aligned as to be 120° apart in phase as referred to the motion of the scanning beam of the color image reproducer 1. If the different color phosphor strips all have substantially the same efficiency of light emission, then for optimum sampling characteristics of the target area, a symmetrical composite color television signal must be formed from the received color television signal information. The symmetrical composite color television signal corresponding to this target area 2 must have a luminance signal wherein the signal level corresponding to red, green and blue light will be related according to the proportions 33⅓%, 33⅓%, and 33⅓%, rather than 30%, 59% and 11%, as included in the luminance signal conforming to the present standards. In addition, the chrominance signal must be converted to a symmetrical chrominance signal whose mean frequency is the frequency of color selection of the target area 2 and wherein the red, green and blue color-difference signals have substantially equal relative signal levels and are phased apart by 120°.

Consider the operation of the block diagram of the color television receiver which is illustrated in Figure 1. This circuit illustrates an embodiment of the present invention, wherein the target area 2 of the color image reproducer 1 conforms to the characteristics described in the preceding paragraph.

The incoming color television signal arrives at the antenna 15 and is applied to the RF converter 16 from which circuit it is applied to the IF amplifier 17. One output of the IF amplifier 17 includes detection apparatus to demodulate the sound information which is amplified in the sound amplifier 19 and applied to the loud speaker 21.

A recovered color television signal is obtained by coupling the color television signal from the IF amplifier 17 into the second detector and first video amplifier 20 via terminal 18. The recovered color television signal is applied via terminal 26 to the sync separator and AGC circuit 25 which provides an AGC voltage to the IF amplifier 17 and the separated deflection synchronizing pulses to the deflection and high voltage circuits 27.

The deflection and high voltage circuits 27 apply final anode and focus electrode voltages as developed respectively at terminals 31 and 30 to the ultor 93 and the focus electrodes 99 of the color image reproducer. In addition, horizontal and vertical deflection voltages from terminals 29 and 28 of the deflection and high voltage circuits 27 are applied to the terminals 95 and 97 respectively of the yoke 91. Another important function of the deflection and high voltage circuits 97 is the providing of a gate pulse 38 via terminal 36 to the color holding circuit 33. The color holding circuit 33 receives the color television signal including color synchronizing bursts from the second detector and first video amplifier 20 by way of terminal 34. Utilizing the gate pulses 38, the color holding circuit 33 separates the color synchronizing bursts from the color television signal and utilizes the synchronizing information provided by the color synchronizing bursts to develop a pair of 3.58 mc. synchronous demodulating signals which are 180° out of phase.

The pair of synchronous demodulating signals provided by the color holding circuit 31 are applied to the three demodulators 41, 39 and 37; a color television signal as provided at terminal 40 of the second detector and first video amplifier 20 is passed through the bandpass filter 35 which has a pass band from 2 to 4 mcs. thereby producing a chrominance signal; the chrominance signal is applied simultaneously to the demodulators 41, 39 and 37. The output signals of the demodulators 41, 39 and 37 are respectively color difference signals of the type $K(R-G)$, $B-\frac{1}{2}R-\frac{1}{2}G$, and $Y-M$ where $K$ is a constant, Y is the luminance signal which is included in the transmitted color television signal and $Y-M$ is that value of color information derived from the color difference signal which, when added to the Y signal, will produce a symmetrical M luminance signal.

The nature of the symmetrical luminance signal M may be understood by considering first the nature of the Y luminance signal and the chrominance signal. The Y luminance signal contains red, green and blue color information according to the signal levels 30%, 59% and 11% respectively. Means must therefore be provided for compensating the red, green and blue component color signals in amplitude to provide relative amplitude levels of substantially 33⅓%, 33⅓%, and 33⅓%. In the present invention, the demodulator 37 is employed to demodulate color difference signal information in that region of the chrominance signal which will yield a signal $$M-Y=+.22B-.26G+.03R$$

This demodulated color difference signal information is then added to the Y luminance signal (in the adder 43) to provide what is substantially an M luminance signal which is termed a symmetrical luminance signal, that is, each of the three component colors are represented at substantially the same signal amplitude level.

The Y luminance signal is passed from the second detector and first video circuit 17 through the Y delay line 23 and by way of terminal 24 into the adder 43 where it is then combined with the output of the demodulator 37 to produce the M symmetrical luminance signal.

Figures 3, 4:
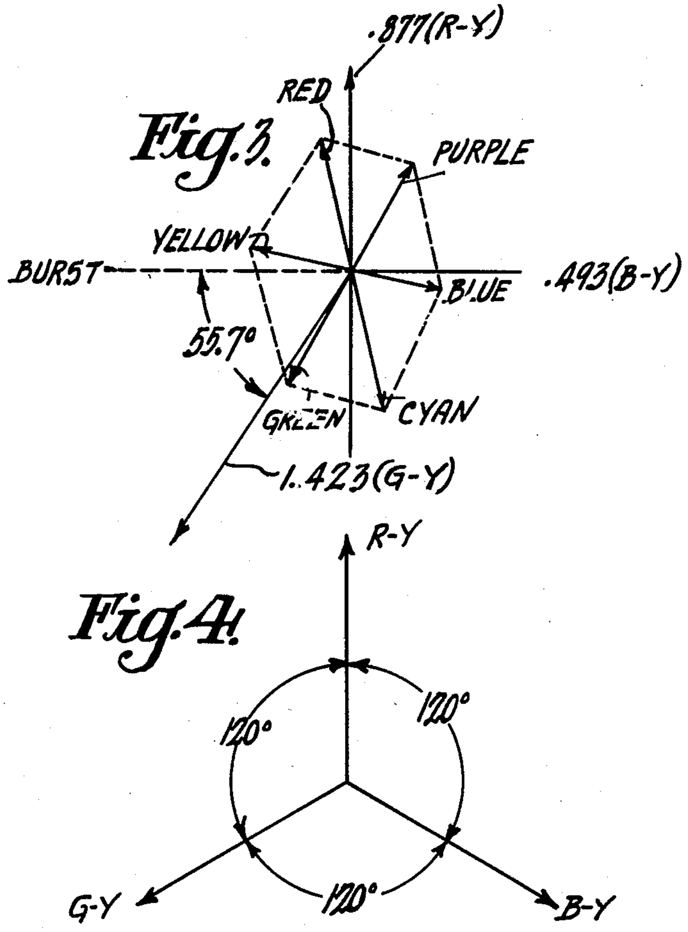
Figure 3 shows the relative phases and the amplitude levels of the color difference signals included in the chrominance signal of the standard color television signal.
Figure 4 illustrates the amplitude and phase relationships between the color difference signals in a symmetrical type of chrominance signal.

The chrominance signal contains a plurality of color difference signals yielding an indication of a continuous change of hue as related to the phase of the chrominance signal and an indication of the saturation as related to the amplitude of each color difference signal. In order that synchronous demodulation may be made possible, color synchronizing bursts conveying reference phase information are transmitted with the color television signal. Figure 3 shows that the $R-Y$ and $B-Y$ color difference signals have phases which lag the burst phase by 90° and 180° respectively with the $G-Y$ color difference signal having a phase which leads the burst phase by 55.7°. Note, too, that the nature of the chrominance signal is such that the $R-Y$, $B-Y$ and $G-Y$ color difference signals are transmitted according to the amplitudes .877, .493, and 1.423 respectively. It follows directly, then, that if the chrominance signal is to be sequentially demodulated in an appropriate color image reproducer which can utilize a sequential series of color difference signals, the very fact that each of the $R-Y$, $B-Y$ and $G-Y$ color difference signals differ in amplitude and that they are not symmetrically displaced in phase, will necessitate means to compensate for these differences in amplitude level and the lack of phase symmetry. In the color image reproducer 1 shown in Figure 1, to illustrate only one type of image reproducer which can be employed for use in the present invention, vertical line strips of color phosphor are utilized to make up the target area 2. The nature of the target area 2 shown in detail in Figure 2 is such that a red light emissive color phosphor strip 3 is sequenced with a blue light emissive phosphor strip 5 and a green light emissive phosphor strip 6 to form a group, with the individual phosphor strips then so aligned as to be 120° apart in phase as referred to the frequency of component color selection characterizing this target area. In order that appropriate synchronization may be achieved between the occurrence of the color television signal applied to the control grid 100 of the color image reproducer 1, and the time sequential sampling of this color television signal in the scanning electron beam of the target area 2, an ultraviolet-light-emitting electron-sensitive-strip 4 is installed along each red light emissive phosphor strip 3 as shown in Figure 2. Thus, when the scanning electron beam traverses each ultra-violet-light-emitting electron-sensitive-strip 4, excitation of the photocell 67 by way of the window 69 is provided. The frequency of color selection is a function of both the horizontal scanning rate and the number of groups of color light emitting phosphors; in an experimental system used, this frequency was in the neighborhood of 6 mc. The photocell 67, in conjunction with the bandpass filter 65 and the limiter 63, is coupled to the terminal 64 of the phase splitter 61 to excite the phase splitter 61 with a 6 mc. sinusoidal wave which, since it is produced by the scanning electron beam on the target area 2, is in exact synchronism with the scanning process employed in the color image reproducer 1; the precise phase and frequency of this sinusoidal wave follows any irregularities which may exist in the target area or of any scanning non-linearity.

In the form of the invention being described, it is desired, in view of the employement of the processes of time sequential sampling of the color television signal on the target area 2, to have a symmetrical chrominance signal of the type shown in Figure 4 wherein the $R-Y$, $B-Y$ and $G-Y$ color difference signals all have the same relative amplitude level and have a phase separation of 120°. If such a symmetrical chrominance signal is added to the M symmetrical luminance signal, it follows that the resulting composite symmetrical color television signal may be time-sequential sampled at 120° intervals to provide red, green and blue information which may be utilized in the color image reproducer 1.

The output signals of the demodulators 41 and 39 of the circuit shown in Figure 1 are therefore applied to the modulators 45 and 47 which are driven by modulating signals at the 6 mc. rate from the phase splitter 61. By utilizing the demodulated color difference signals previously mentioned in connection with the demodulators 41 and 39, a new symmetrical chrominance signal of the type shown in Figure 4 will be formed. This new symmetrical chrominance signal has the bandwidth characteristics illustrated by the characteristic curve 55.

The M symmetrical luminance signal having a bandwidth from approximately zero to 3 megacycles is applied from the adder 43, through the M delay line 44, to the adder 49 to which is also applied the symmetrical chrominance signal having a bandwidth from approximately 5.5 mc. to 6.5 mc., supplied by the modulators 45 and 47. The output of the adder 49 as developed at terminal 54 is the symmetrical composite color television signal whose frequency bandwidth characteristics are illustrated by the characteristic curve 60. The symmetrical composite color television signal is then passed through the video output stage 53 at whose output, the amplified symmetrical composite color television signal is subjected to D.C. restoration by the D.C. restorer 57 and to black level clipping as provided by the black level clipper 59. The resultant symmetrical composite color television signal whose chrominance phases are in accurate synchronism with the impinging of the scanning electron beam on the target area 2, is then applied to the control grid 100 of the color image reproducer 1 wherein time sequential sampling of the symmetrical composite color television signal is accomplished.

In the color television receiver described in Fig. 1, the color difference signals encounter both demodulation and remodulation processes. In order to accomplish the process of synchronous demodulation and balanced modulator operation, demodulator circuits of the type described, for example, by Pritchard and Rhodes in the article entitled "Color Television Signal Receiver Demodulators" as published in the June 1953 issue of the RCA Review, may be employed. Balanced modulators of the type described by Gloystein and Turner in their paper entitled "The Colorplexer—A Device for Multiplexing Color Television Signals in Accordance With the NTSC Signal Specifications" as published in the January 1954 issue of the Proceedings of the I.R.E., may also be employed. As an alternative circuit which will provide modulation or demodulation and which will also provide circuit simplification in the accomplishment of the present invention, consider the circuit shown in Figure 5. Consider first the operation of the circuit of Figure 5 as a balanced modulator.

Let a color difference signal be applied to the terminal 71 with a color subcarrier $e(\theta)$ applied to the terminal 82 and a color subcarrier $e(\theta-\pi)$ applied to the terminal 80. If the resonant circuit 77 has for its resonant frequency, the frequency of the color subcarrier, then the anode of the rectifier 74 will be varied in potential with inverse polarity with respect to the potential variations experienced by the cathode of the rectifier 73. Thus, both rectifiers 73 and 74 will conduct simultaneously during a prescribed time interval of each cycle of the color subcarrier $e(\theta)$; the color difference signal impressed at the terminal 71 will become mixed with color subcarriers developed at the rectifiers 73 and 74 due to the nonlinear impedance characteristics of these rectifiers; and a color-difference-signal modulated color subcarrier will appear at the terminal 84. Because the color subcarriers, as applied to the rectifiers 73 and 74 are of opposite polarity, the color subcarrier signals reaching the output terminal 84 and developed across the circuit $Z_b$ bearing the designator 81 will be suppressed. Thus, the simple circuit shown in Figure 5 is ideally suited for use as a balanced modulator circuit.

Figure 5:
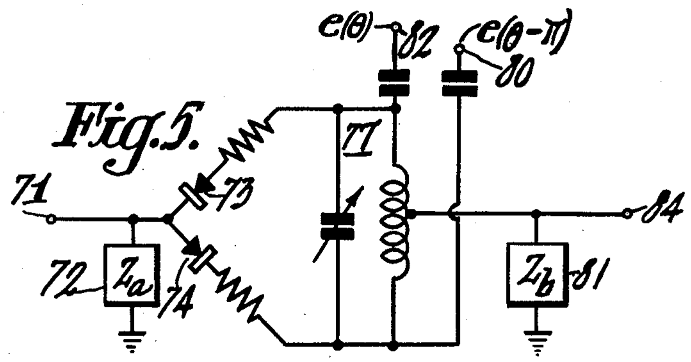
Figure 5 shows a simple balanced diode circuit which may be utilized for the demodulation of a color difference signal from a chrominance signal and which may be also employed for modulating a subcarrier signal with a color difference signal.

Consider the operation of the circuit of Figure 5 as a synchronous demodulator. Let an incoming chrominance signal containing at least a color difference signal having a prescribed phase relative to a reference phase be applied to the terminal 84. If a local signal generator is employed to apply the signals $e(\theta)$ and $e(\theta-\pi)$ to the terminals 80 and 82 respectively, where $\theta$ is now the phase angle which must be employed for synchronous demodulation of the color difference signal, the chrominance signal will be sampled at intervals of time corresponding to the peaks of the color difference signal. By utilizing suitable capacitors and decay circuits in the circuit $Za$ bearing the designator 72 so that the circuit will follow the amplitude level of the sampled envelope of the chrominance signal, the color difference signal, identified with the phase angle $\theta$ will be caused to appear at what will then become the output terminal 71.

Figure 6:
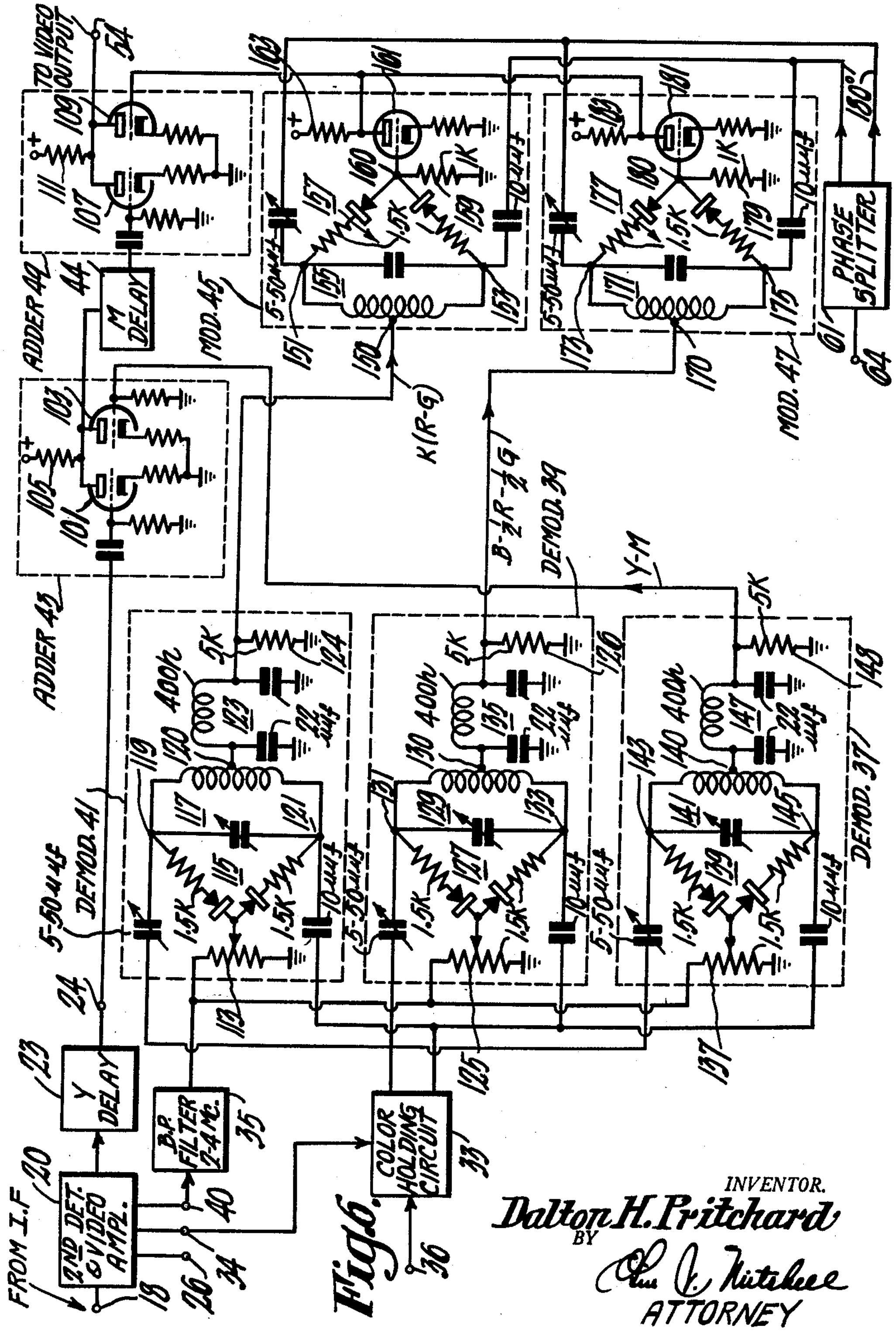
Figure 6 shows the schematic diagram of a circuit which may be utilized for converting the composite color television signal, which conforms to standard signal specifications, to a symmetrical composite color television signal in accordance with the present invention.

Consider now the schematic diagram shown in Fig. 6 wherein are included simplified circuits for the demodulators 37, 39 and 41 and the modulators 45 and 47 which function in accordance with the principles previously described in connection with the circuit shown in Figure 5.

The adder 43 consists of a pair of triodes 101 and 103 which operate into a common output load resistor 105. The Y luminance signal as provided by second detector and first video 20 and time-delayed by the Y delay line 23, is applied to the control grid of the triode 101.

The chrominance signal, as provided by the bandpass filter 35, is supplied to the potentiometer 137 which constitutes the input circuit of the demodulator 37. The demodulator 37 also includes the rectifier circuit 139, the resonant circuit 141, the low-pass filter 147 and the output resistor 148. Synchronous demodulating signals, phased 180° apart in phase, are then applied from the color holding circuit 33 to the end terminals 143 and 145 respectively of the resonant circuit 141 of the demodulator 37. By detuning the resonant circuit 141, a synchronous demodulating signal having the phase characteristics of the $Y-M$ signal will be provided at the end terminal 145; a synchronous demodulating signal having a phase 180° out of phase with respect to the previously mentioned phase of the $Y-M$ signal will also be applied to the end terminal 143. The $Y-M$ phase is that phase of the chrominance signal which will supply sufficient amplitudes and polarities of red, green and blue information so that addition of the $Y-M$ signal when applied to the control grid of the triode 103 and the Y signal applied to the control grid of the triode 101, both triodes of the adder 43, will produce the symmetrical M luminance signal across the output resistor 105. The $Y-M$ signal is coupled to the control grid of triode 103 of the adder 43.

The demodulators 39 and 41 also accept the chrominance signal from the bandpass filter 35 onto their respective potentiometers 125 and 113. The tuning of the resonant circuit 117 of the demodulator 41 is such that a synchronous demodulating signal having the phase corresponding to the $K$ $(R-G)$ color difference signal will appear across the end terminal 121 with a synchronous demodulating signal, 180° out of phase with respect to the phase of this signal produced at the end terminal 119. The $K$ $(R-G)$ phase is approximately 90° out of phase with respect to the blue signal phase shown in Figure 3.

In like manner, the resonant circuit 129 of the demodulator 39 is tuned to provide an in-phase synchronous demodulating signal and a 180° out-of-phase synchronous demodulating signal corresponding to the $(B-\frac{1}{2}R-\frac{1}{2}G)$ color difference signal at the end terminals 133 and 131 respectively.

The $K(R-G)$ color difference signal modulated subcarrier is developed by the rectifier circuit 115, filtered and translated by the low pass filter 123 to the load resistor 124 and applied to the center tap 150 of the resonant circuit 155 of the modulator 45. The $(B-\frac{1}{2}R-\frac{1}{2}G)$ color difference signal modulated subcarrier is developed by the rectifier circuit 127, filtered and translated by the low pass filter 135 to the load resistor 126 and applied to the center tap 170 of the resonant circuit 171 of the modulator 47.

The phase splitter 61 supplies a pair of 180° out of phase subcarrier signals to the end terminals 151 and 153 of the resonant circuit 155 and the end terminals 173 and 175 of the resonant circuit 171.

In the modulator 45, the subcarrier signals supplied by the resonant circuit 155 to the rectifier circuit 157 are adjusted to the phase of $K(R-G)$ color difference signal by the corresponding tuning of the resonant circuit 155. The developed $K(R-G)$ color difference signal modulated subcarrier is produced across the resistor 159 and utilized to drive the tube 161 which in turn drives the control grid of the tube 109 of the adder 49.

In the modulator 47, the subcarrier signals supplied by the resonant circuit 171 to the rectifier circuit 177 are adjusted to the phase of the $(B-\frac{1}{2}R-\frac{1}{2}G)$ color difference signal by the corresponding tuning of the resonant circuit 171. The developed $(B-\frac{1}{2}R-\frac{1}{2}G)$ color difference signal modulated subcarrier is produced across the resistor 179 and utilized to drive the tube 181 which in turn drives the control grid of the tube 109 of the adder 49.

The outputs of the modulator 45 and the modulator 47 as applied to the control grid of the tube 109 produce a suppressed carrier symmetrical chrominance signal across the common plate resistor 111. At the same time, the symmetrical luminance signal M, which is produced in the adder 43, is passed through the delay line 44 and applied to the control grid of the tube 107 of the adder 49. Since both the tube 107 also utilizes the common output resistor 111 as its output load, the symmetrical chrominance signal and the symmetrical M luminance signal are added together across that output resistor 111 to provide a symmetrical composite color television signal at the terminal 54.

It is to be noted that the low-pass filters 123, 135 and 147 which are contained in the demodulators 41, 39 and 37 respectively, have a pass band from approximately 0 to 1 mc. This pass band is suitable not only for limiting the color difference signals to an upper frequency limit of 1 mc., but also to prevent any signals in the chrominance signal range from being applied to the input circuits of the modulators 45 and 47.

The following important considerations are pertinent to the operational procedures associated with the present invention. Since, of necessity, the color phosphor strips must have a finite width, the sampling process in the color image reproducer 1 has a finite degree of symmetrical crosstalk resulting in the uniform de-saturation of the reproduced colors. That is to say, 100% saturated colors could not be accurately reproduced utilizing the standard color television signal. However, this fault can be overcome simply by increasing the level of the symmetrical chrominance signal in the new composite color television signal by just the correct amount to compensate for the de-saturation resulting from the finite width of the color strips, thereby making it possible to reproduce a color image having 100% saturation.

A difficulty arises from this method of operation, however, since the negative excursions of the chrominance sine wave signal would, under the conditions described above, swing in the blacker-than-black direction on certain saturated colors by 33% or more. This would result in cutting off the beam and the loss of the reference signal derived from the indexing strips and thereby cause momentary loss of phase information. At least one approach to overcome this difficulty involves the placing of the indexing strip in the center of one of the primary color phosphor strips; the sine wave during this instant will then always be at its maximum excursion in the white direction and will just be going through zero during the other two primary colors. Therefore, the indexing strip will not lose excitation on 100% saturated colors. If it is necessary to increase the chrominance signal amplitude relative to the luminance signal amplitude, beyond that value representing 100% saturation, a clipper would have to be utilized to prevent the chrominance sine wave excursion from extending in the blacker-than-black direction more than the normal 33⅓%.

Having described the invention, what is claimed is:

1. In a color television receiver, the combination of, a color image reproducer having a color target area wherein component colors may be selected at a predetermined frequency and phase; a source of a first color television signal representing a color image and including both a luminance signal and a chrominance signal each containing component color information relating to predetermined colors on said color target area, said luminance signal including component color information at a first set of amplitude levels, said chrominance signal consisting of a carrier modulated to include component color-difference information signals according to a second set of amplitude levels and wherein said component color-difference information signals conform to a first prescribed phase relationship, said chrominance signal having a first prescribed mean frequency, signal amplitude control means coupled to said source for converting the amplitude of the component color information in said luminance signal to a third set of amplitude levels and the component color-difference information signals in said chrominance signal to a fourth set of amplitude levels, phase control means coupled to said source for adjusting the phases of said component color-difference information signals in said chrominance signal to a second prescribed phase relationship, frequency control means for adjusting the mean frequency of said chrominance signal to said frequency of component color selection, combining means coupled to said amplitude, phase and frequency control means to produce a second color television signal also representing said color image, signal clipper means coupled to said combining means for clipping said second color television signal at a prescribed clipping level, coupling means for coupling said clipped second color television signal to said color image reproducer.

2. In a color television receiver, the combination of, a source of color television signals representing a color image and including a luminance signal which contains red, green and blue color information signals having a first prescribed amplitude relationship, and a chrominance signal which contains red, green and blue color difference information signals having amplitudes according to a second prescribed amplitude relationship and phases according to a first prescribed phase relationship, a sequential color image reproducer having a color control input terminal and having an image face wherein component red, green and blue colors may be selected at a prescribed frequency and phase and wherein a prescribed relationship exists between component color light output efficiency, said sequential color image reproducer including means for developing a control signal indicative of said prescribed frequency and phase of color selection, an amplitude adjusting circuit coupled to said source for forming a second luminance signal wherein said red, green and blue color signals are adjusted to amplitude levels conforming to a third prescribed amplitude relationship, an amplitude, frequency and phase adjusting circuit coupled to said source for forming a second chrominance signal wherein said red, green and blue color difference information signals are adjusted in amplitude level in accordance with a fourth prescribed amplitude relationship and including means responsive to said control signal for adjusting the frequency of said chrominance signal to said prescribed frequency of component color selection and the phases of said red, green and blue color difference signals to a second prescribed phase relationship, means for adding said second luminance signal and said second chrominance signal to form a second color television signal still representative of said color image and having said prescribed frequency and phase between component red, green and blue color information signals included in said second color television signal and having component color amplitude levels corresponding to said prescribed relationship between component color light output efficiencies describing the component color light output of said image face, and means for coupling said second color television signal to said color control input terminal.

3. In a color television receiver, the combination of, a source of a color television signal representing a color image, said color television signal including a luminance signal which contains red, green and blue color information signals having a first prescribed amplitude relationship, and a chrominance signal which contains red, green and blue color difference information signals having amplitudes according to a second prescribed amplitude relationship and phases according to a first prescribed phase relationship, a sequential color image reproducer having a color control input terminal and having an image face wherein time sequential sampling may be accomplished at a prescribed frequency and phasing of color selection and wherein prescribed relationship exists between component color light output efficiency, an amplitude adjusting circuit coupled to said source for forming a second luminance signal wherein said red, green and blue color signals have amplitudes conforming to a third prescribed amplitude relationship, an amplitude and phase adjusting circuit coupled to said source for developing a second chrominance signal wherein said red, green and blue color difference signals are adjusted in amplitude in accordance with a fourth prescribed amplitude relationship and in phase according to a second prescribed phase relationship, and including means for adjusting the frequency of said chrominance signal to said frequency of color selection, means for adding said second luminance signal and said second chrominance signal to form a second color television signal still representative of said color image and having a frequency and phasing of component color selection corresponding to said frequency and phasing of time sequential sampling on said image face and having component color amplitude levels corresponding to said prescribed relationship between component color light output efficiency describing the component color light output of said image face, and means for coupling said second color television signal to said color control input terminal.

4. In a color television receiver, the combination of, a source of a first color television signal representing a color image and including a luminance signal and a chrominance signal and color synchronizing bursts, said luminance signal formed by a combination of prescribed component color information signals at unequal amplitudes and said chrominance signal consisting of a suppressed carrier modulated subcarrier which contains color difference information signals relating to said prescribed color signals and wherein the amplitudes of said color difference signals are unequal and the phases of said color difference information signals are asymmetrically spaced in time, a color image reproducer wherein time sequential sampling may be accomplished at a prescribed frequency and phase of component color selection and having a color control electrode, a combined demodulator and modulator means responsive to at least said color synchronizing bursts for demodulating said chrominance signal to produce at least a pair of color difference information signals which are then remodulated onto a new subcarrier having said prescribed frequency of component color selection to form a second chrominance signal wherein said color difference information signals corresponding to said prescribed component color information signals have substantially equal relative amplitude level and have phases symmetrically spaced in time, amplitude control means for deriving from said combined demodulator and modulating means a predetermined color difference information signal which when added to said luminance signal forms a second luminance signal wherein said prescribed color component signals are of substantially equal relative amplitude levels, means to combine said luminance signal and said latter named color difference information signal to form a second luminance signal, adder means for combining said second luminance signal and said second chrominance signal to form a second color television signal still representative of said color image, and means for applying said second color television signal to said color control electrode of said color image reproducer.

5. In a color television receiver, the combination of, a source of a first color television signal representing a color image and including a luminance Y signal and a chrominance signal, and color synchronizing bursts bearing reference phase information, said luminance signal formed by a combination of prescribed component color information signals namely red, green and blue or R, G and B signals at unequal amplitudes and said chrominance signal consisting of a suppressed carrier modulated subcarrier which contains the color difference information signals denoted as $R-Y$, $B-Y$ and $G-Y$ signals and wherein the amplitudes of said color difference signals are unequal and wherein their phases as referred to the reference phase of said color synchronizing bursts are asymmetrically spaced in time, a color image reproducer means having a color target area on which time sequential sampling may be accomplished at a frequency and phase of component color selection and having a control electrode, a demodulator circuit coupled to said source and including a plurality of synchronous demodulator circuits which employ apparatus for deriving synchronous demodulating signals of prescribed phase from said color synchronizing bursts and wherein are demodulated at least a $K$ $(R-G)$, $(B-\frac{1}{2}R-\frac{1}{2}G)$, and a $(Y-M)$ signal, said M signal composed according to the proportions 22% B, 0.03 R, and −26% G; adder means for combining said Y luminance signal with said $Y-M$ signal to produce an M luminance signal and wherein said prescribed component color information signals namely R, G and B signals are contained at substantially equal amplitudes, a modulator circuit including apparatus for deriving a second subcarrier signal having the frequency of component color selection and coupled to said demodulator circuit to accept at least said $K$ $(R-G)$ and said $(B-\frac{1}{2}R-\frac{1}{2}G)$ signals to form a second chrominance signal, wherein said $R-Y$, $B-Y$, and $G-Y$ signals are of substantially equal relative amplitude levels and have phases which are symmetrically spaced in time, a second adder means for combining said M luminance signal and said second chrominance signal to form a second color television signal which is also representative of the color image represented by said first color television signal, means for coupling said color television signal to said color control terminal of said color image reproducer whereby time sequential sampling of said second color television signal is effected to provide reconstruction of said color image on said color target area.

6. The combination of, a color image reproducer including an image area wherein component colors may be selected at a first frequency and phase relationship and wherein the image area has prescribed component color light emission efficiency characteristics, a source of a first composite signal representing a color image and including a first luminosity information signal comprising a plurality of component color information signals having a first arrangement of relative intensities and also a chrominance signal having a second frequency and comprising groups of color difference signals arranged to be capable of being selected at a second phase relationship and having first prescribed relative levels of intensity and a first prescribed relationship between the relative amplitude levels of component color difference signals, frequency and phase changing means coupled to said source for developing a second chrominance signal having a second group of color difference signals also representing said color image and having both said first frequency and also said first phase relationship relating the occurrence of the component color signals therein, means coupled to said source to develop a signal which when added to said first luminosity information signal is capable of producing a second luminosity information signal wherein the relative intensities of the component color information signals in said second chrominance signal bear predetermined relationships to said prescribed component color light emission characteristics of said image area, means for adding said latter named developed signal to said first luminosity information signal to produce said second luminosity information signal, means to combine said second chrominance signal and said second luminosity information signals to form a second composite signal, and means to apply said second composite signal to said color image reproducer.

7. In combination with a color image reproducer including an image area wherein component colors may be selected at a first frequency and phase and including apparatus for providing a control signal representative of said first frequency and phase and wherein the image area has prescribed component color light emission efficiency characteristics, a source of a luminance signal and a first chrominance signal representing a color image, said first chrominance signal having a second frequency, predetermined phases of said first chrominance signal representing different component color signals and a first prescribed relationship between component color signal relative amplitude levels, said luminance signal consisting of information relating to a plurality of component colors according to a first set of proportions, means to derive a trio of color difference signals corresponding to selected different phases of said chrominance signal, a first and second modulator means coupled to said control signal providing means and to color difference signal deriving means and responsive to said control signal and to a first and a second of said trio of said color difference signals to develop a second chrominance signal including color difference signal information located at different phases than in said first chrominance signal and also representing said color image; said second chrominance signal having said first frequency and phase for the selection of component color signals therein, means to combine said luminance signal and the third of said trio of color difference signals to produce a second luminance signal wherein the information relating to said plurality of component colors is included at a second set of proportions, means to combine said second luminance signal and said second chrominance signal to form a composite signal including component color information at phases and amplitudes related to said prescribed component color light emission characteristics of said image area, and means for utilizing said composite signal in said color image reproducer.

8. In a color television receiver for receiving a standard color television signal including color synchronizing bursts, a luminance signal, and a chrominance signal consisting of a color subcarrier having red, blue and green color information at predetermined non-symmetrical phases of the subcarrier, the combination of: first, second and third demodulators, a source of chrominance signal coupled to said demodulators, means responsive to said bursts to generate continuous color demodulating oscillations and to couple different phases of the oscillations to said demodulators, first and second modulators having inputs coupled to the outputs of said first and second demodulators, a cathode ray tube image reproducing device including an input terminal and a target of color light producing elements and means to generate a signal having a frequency representing the rate at which the beam scans the color light producing elements, means coupling said signal in different phases to said modulators, a source of said luminance signal, means to combine the output of said source of luminance signal, the output of said third demodulator, and the outputs of said first and second modulators, and means to apply said combined signal to the input terminal of said cathode ray tube image reproducing device.

References Cited in the file of this patent

UNITED STATES PATENTS

| | | |
|---|---|---|
| 2,667,534 | Creamer | Jan. 26, 1954 |
| 2,705,257 | Lawrence | Mar. 29, 1954 |
| 2,713,605 | Bradley | July 19, 1955 |
| 2,725,421 | Valdes | Nov. 29, 1955 |
| 2,773,117 | Clapp | Dec. 4, 1956 |